| United States Patent [19]
Po | [11] Patent Number: 4,924,899
[45] Date of Patent: May 15, 1990 |

[54] GAS MOUTH

[76] Inventor: Tsai J. Po, 191, Minchuan Rd., Tamshui Taipei, Taiwan

[21] Appl. No.: 412,208

[22] Filed: Sep. 25, 1989

[51] Int. Cl.$^5$ .................... F16K 15/14; F16K 15/20
[52] U.S. Cl. ........................ 137/232; 137/848; 137/855; 446/222; 446/224
[58] Field of Search ............... 137/223, 232, 845, 848, 137/855; 446/222, 224

[56] References Cited

U.S. PATENT DOCUMENTS

| 2,700,980 | 2/1955 | Andrews | 137/848 X |
| 2,839,073 | 6/1958 | Marsh | 137/232 |
| 2,841,166 | 7/1958 | Auzin | 137/848 X |
| 2,977,973 | 4/1961 | Chakine | 446/222 X |
| 4,004,614 | 1/1977 | Mackal et al. | 446/222 X |
| 4,823,831 | 4/1989 | Jaw | 137/232 X |
| 4,828,176 | 5/1989 | Crowe | 446/222 X |

FOREIGN PATENT DOCUMENTS

| 797059 | 6/1958 | United Kingdom | 137/232 |
| 2093709 | 9/1982 | United Kingdom | 446/222 |

Primary Examiner—John Rivell
Attorney, Agent, or Firm—Ho & Chu

[57] ABSTRACT

A gas inlet including an inlet body having a gas passage, a tube body and a plug body, wherein the tube body and plug body are connected to the inlet body via a thin strip. The tube body has a close end and a cut and is suitable to be fitly fitted into the gas passage, while the plug body is suitable to be plugged into the tube body, whereby by means of plugging or removing the tube body and plug body, an inflatable product can be rapidly inflated or deflated.

4 Claims, 5 Drawing Sheets

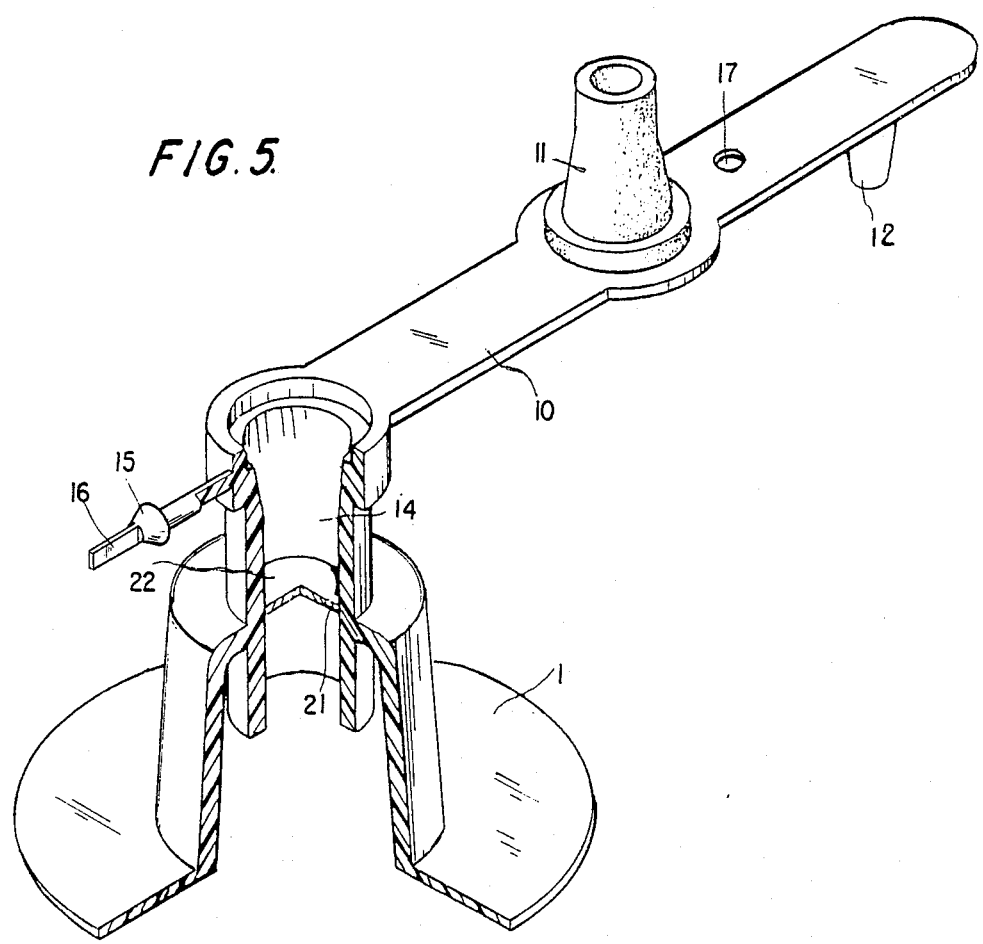
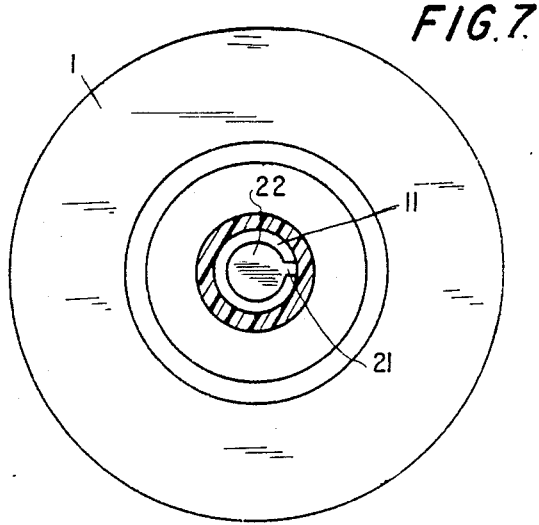

GAS MOUTH

BACKGROUND OF THE INVENTION

Nowadays, inflatable toys and entertainment devices are more and more popular. Such inflatable products must be provided with gas mouths for inflating and deflating the products. As shown in FIG. 10, a conventional gas mouth has a blind passage (A) formed with a cut (B) near the bottom thereof. The cut (B) serves as an aperture through which gas flows in and out. When inflating, the cut (B) is pinched by hand to open, permitting gas to be inflated into the product, while deflating, the cut (B) is also pinched by hand or is pierced by a slender rod to open for deflating gas contained in the product.

According to the prior arrangement, one must inflat the product with his one hand pinching the cut (B) and with his other hand operating a pump. Therefore, the inflating process appears to be quite inconvenient and exhaustive. Moreover, a slender rod must be found to deflat the product.

FIG. 11 shows another conventional gas mouth. Such gas mouth has an open passage (A') and a valve plate (C) disposed thereunder to seal the passage (A'). When inflating, no pinch is required in this gas mouth. However, when deflating, a rod is still required to displace the valve (C).

SUMMARY OF THE INVENTION

It is an object of the present invention to provide a gas mouth of inflatable product, having a gas passage to which a tube body and a plug body are connected via a thin strip. The tube body can be blind or open. In case of a blind tube body, a cut must be formed thereon. The tube body can be fitly fitted into the pass and the plug body can be closely plugged into the tube body.

In case of an open tube body, then a valve plate is disposed in the passage whereby when the tube body is fitted into the passage, the valve plate will seal one end of the tube body.

A securing member is further connected to the gas mouth whereby the tube body can be secured to the passage with the securing member going through a corresponding hole formed on the thin strip. Thereby, when pulling out the plug body from the tube body, the same will not separate from the passage along with the plug body.

When the tube body is not inserted in to the passage, a rapid inflation or a deflation can be performed.

When the tube body is fitted into the passage, a safety inflation can be performed without escaping of gas. After the inflation is completed, the plug can be plugged into the tube body to seal the passage.

The present invention can be best understood through the following description with reference to the accompanying drawings wherein:

BRIEF DESCRIPTION OF THE DRAWINGS:

FIG. 5 is a perspective partially sectional view of another preferred embodiment of the present invention;

FIG. 7 is a cross-sectional view taken on line 7—7 in FIG. 6;

DETAILED DESCRIPTION OF THE PREFERRED EMBODIMENTS

Figure 1:
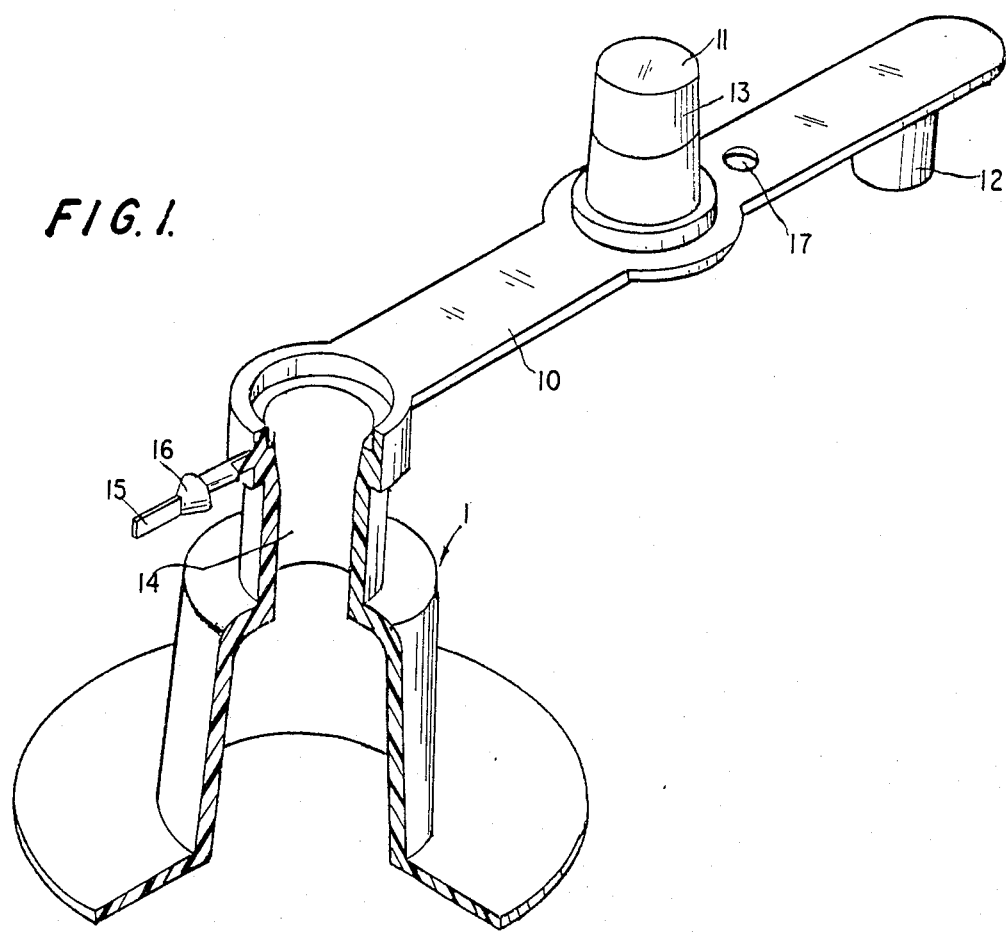
FIG. 1 is a perspective partially sectional view of one preferred embodiment of the present invention.
Figure 2:
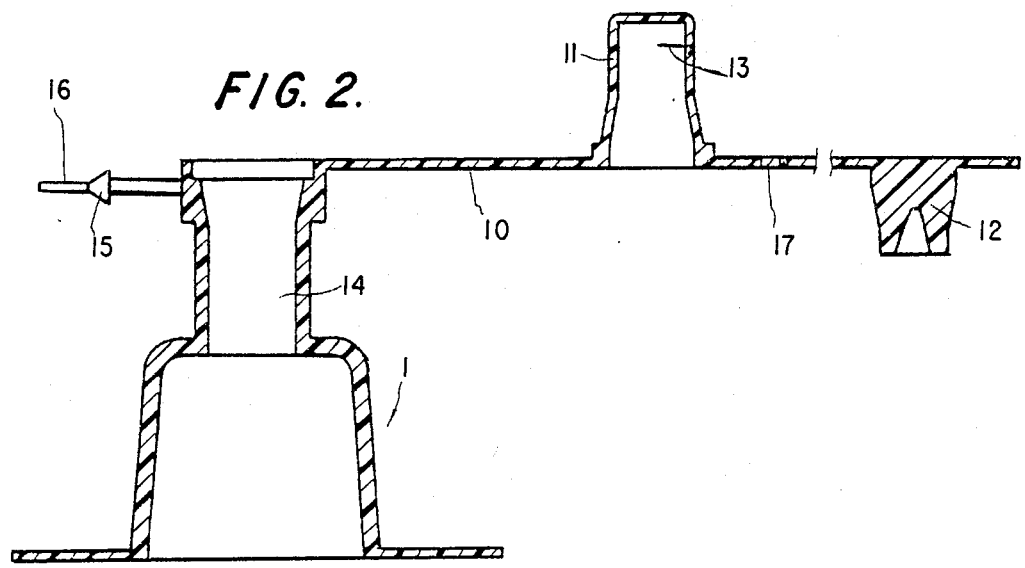
FIG. 2 is a longitudinal sectional view thereof.

Please refer to FIG. 1 and FIG. 2, the present invention includes a mouth body 1 having a gas passage 14, a tube body 11 and a plug body 12 connected to a top periphery of the mouth body 1 through a thin strip 10. The tube body 11 has a close end away from the strip 10, and a cut 13 is formed on the tube body 11. The tube body 11 is so shaped as to be fitly plugged into the gas passage 14, while the plug body 12 is so shaped as to be closely plugged into the tube body 11.

A conic securing member 15 is affixed to the mouth body 1 by a slender strip 16, and a hole 17 is formed on the thin strip 10 corresponding to the securing member 15, whereby when tube body 11 is plugged into the passage 14, the securing member 15 can be pulled through the hole 17 to keep the tube member 11 plugged in the passage 14.

As shown in FIG. 2, when inflating, gas can flow rapidly through the passage 14 into the inflated product without using a hand to pinch the mouth body 1.

Figure 3:
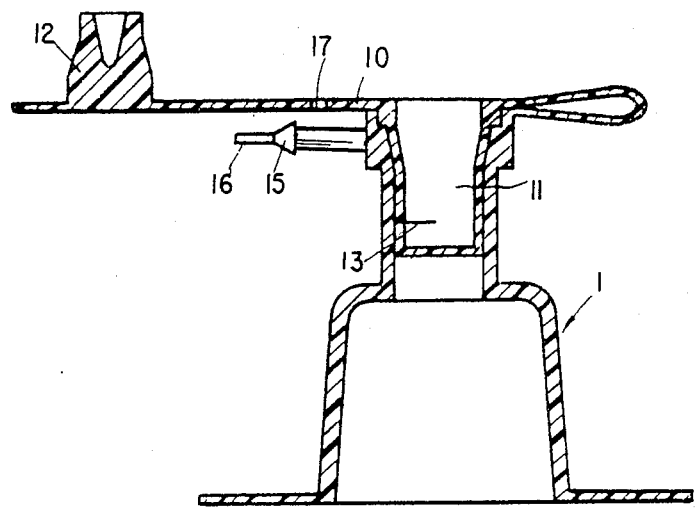
FIG. 3 is a sectional view according to FIG. 2, showing that the tube body is fitted into the gas passage.
Figure 4:
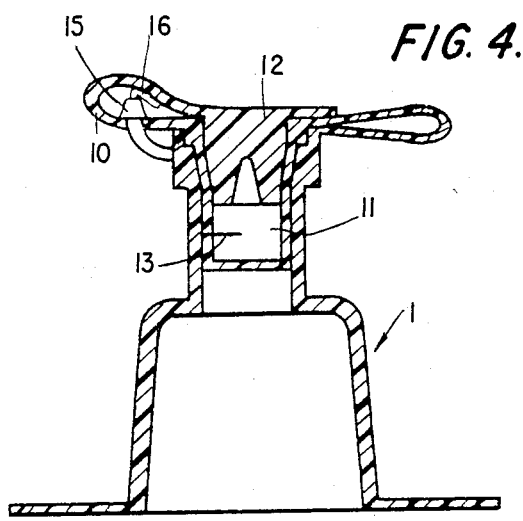
FIG. 4 is a sectional view according to FIG. 3, showing the plug body is plugged into the tube body.

After the inflation is completed, the tube body 11 is fitted into the passage 14, as shown in FIG. 3. At this time, the pressure caused by gas contained in the product will keep the cut 13 of tube body 11 sealed without leakage. Then the securing member 15 together with the slender strip 16 is conducted through the hole 17 of the thin strip 10 to secure the thin strip 10 for keeping the tube body 11 plugged in the passage 14. The thin strip 10 is made from flexible material so that the securing member 15 can easily go through the hole 17. The plug body 12 is then further plugged into tube body 11 to avoid leakage, as shown in FIG. 4. In case that the gas pressure is insufficient and an inflation is required, the plug body 12 can be removed with the tube body 11 still fitted in the passage 14 by means of the securing member 15. In this position, one can slightly pinch the mouth body 1 to open the cut 13 of the tube body 11 for inflation. Because this inflation requires only a short time, thus one will not feel bored.

Figure 6:
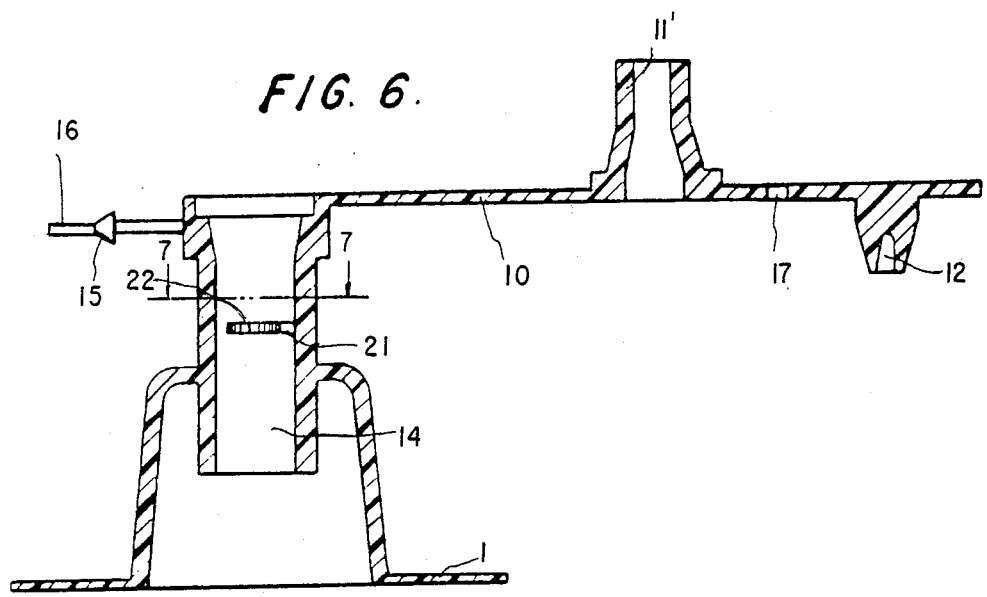
FIG. 6 is a longitudinal sectional view according to FIG. 5.
Figure 8:
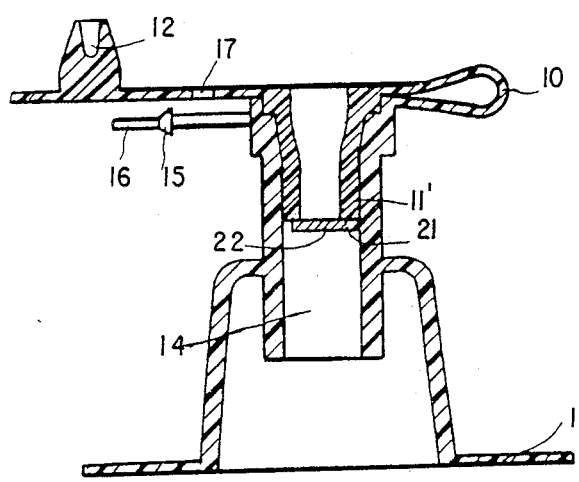
FIG. 8 and FIG. 9 show the sealing process according to the second embodiment of the present invention.
Figure 9:
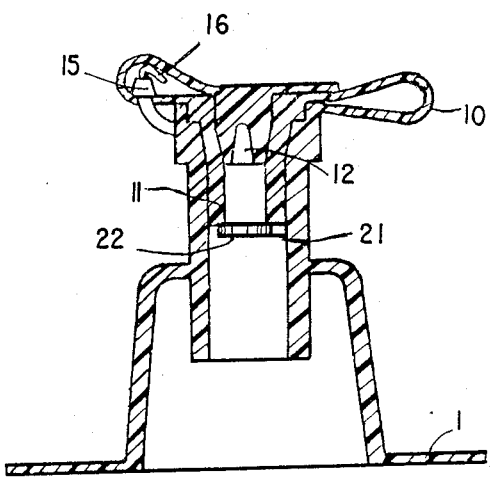
Figure 10:
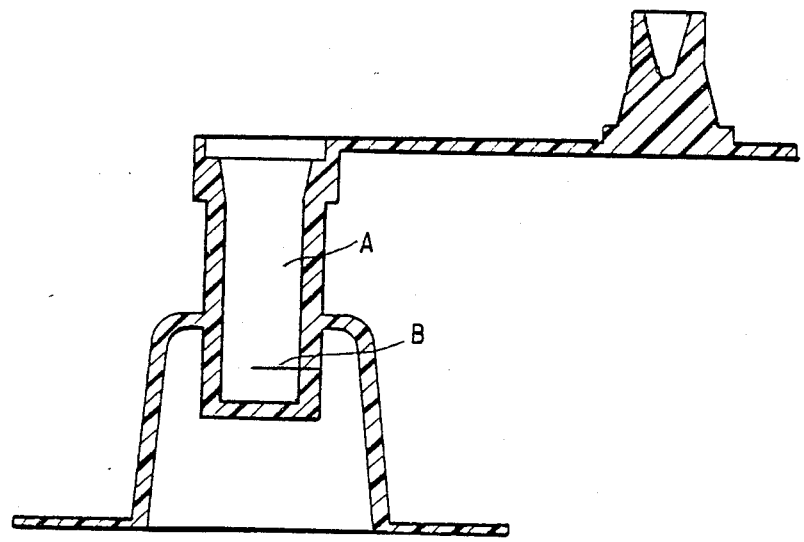
FIG. 10 and FIG. 11 show two conventional gas mouths respectively.
Figure 11:
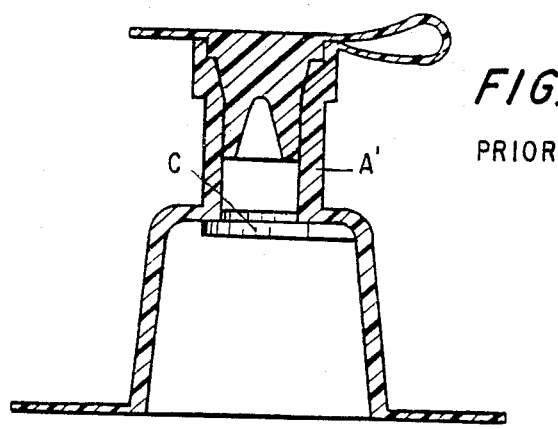

When deflating, the present invention can be even more conveniently operated. The plug body 12 and tube body 11 are sequentially removed from the passage 14 and gas flows out through the passage 14 freely and rapidly. Please now refer to FIGS. 5, 6, which show another embodiment of the present invention. In this embodiment, a valve plate 22 is disposed in the passage 14. The diameter of the valve plate 22 is slightly smaller than the inner diameter of the passage 14 so that the valve plate 22 can swing therein. A tube body 11' having a through hole is connected to the mouth body 1 by the thin strip 10. The inner diameter of the tube 11' is smaller than the diameter of the valve plate 22 whereby when the tube body 11' is closely fitted into the passage 14, the valve plate 22 can fitly seal a lower opening of the tube body 11'.

In this embodiment, as shown in FIG. 7, gas can be rapidly inflated into a inflated product through gap between the valve plate 22 and inner wall of the passage 14. (The valve plate 22 will be urged to oppose against inner wall of the passage 14 when inflating gas into the product.)

Reversely, when deflating the product, the tube body 11' and plug body 12 are removed from the passage 14, and gas contained in the product is rapidly exhausted through gap between the valve plate 22 and inner wall of the passage 14.

I claim:

1. A gas mouth comprising a mouth body having a gas passage, a tube body and a plug body, said tube body and a plug body being connected to a top periphery of said mouth body via a thin strip, said tube body having a close end away from said strip and a cut and being suitable to be fitly fitted into said passage, said plug body being suitable to be closely plugged into said tube body.

2. A gas mouth comprising a mouth body having a gas passage, a tube body having a through hole, and a plug body, said tube body and plug body being connected to a top periphery of said mouth body via a thin strip, a valve plate being disposed in said gas passage, said valve plate having a diameter slightly smaller than inner diameter of said passage and slightly larger than inner diameter of said tube body, said tube body being suitable to be fitly fitted into said passage, said plug body being suitable to be closely plugged into said tube body, wherein when said tube body is fitted into said passage, said valve plate is located right under said tube body to seal said through hole thereof.

3. A gas mouth as claimed in claim 1 or claim 2, wherein a conic securing means is affixed to said mouth body and a corresponding hole is formed on said thin strip, whereby said securing means is suitable to go through said corresponding hole to keep said tube body fitted in said passage.

4. A gas mouth as claimed in claim 3, wherein said conic securing means is affixed to said mouth body via a flexible slender strip.

* * * * *